(12) United States Patent
Fukui et al.

(10) Patent No.: US 10,006,389 B2
(45) Date of Patent: Jun. 26, 2018

(54) ENGINE WITH SUPERCHARGER

(71) Applicant: YANMAR CO., LTD., Osaka-shi, Osaka (JP)

(72) Inventors: Yoshinori Fukui, Osaka (JP); Fumihiro Nishiura, Osaka (JP); Shunji Hamaoka, Osaka (JP); Toshihisa Kanda, Osaka (JP)

(73) Assignee: YANMAR CO., LTD., Osaka-shi, Osaka (JP)

(*) Notice: Subject to any disclaimer, the term of this patent is extended or adjusted under 35 U.S.C. 154(b) by 13 days.

(21) Appl. No.: 15/030,582

(22) PCT Filed: Oct. 20, 2014

(86) PCT No.: PCT/JP2014/077866
§ 371 (c)(1),
(2) Date: Jul. 11, 2016

(87) PCT Pub. No.: WO2015/060262
PCT Pub. Date: Apr. 30, 2015

(65) Prior Publication Data
US 2016/0312720 A1   Oct. 27, 2016

(30) Foreign Application Priority Data

Oct. 22, 2013   (JP) .................................. 2013-219693

(51) Int. Cl.
*F01N 3/00*    (2006.01)
*F02D 41/02*   (2006.01)
(Continued)

(52) U.S. Cl.
CPC .......... *F02D 41/0245* (2013.01); *F01N 3/08* (2013.01); *F01N 3/20* (2013.01); *F01N 3/206* (2013.01);
(Continued)

(58) Field of Classification Search
CPC .......................... F02D 41/0245; F01N 3/2053
See application file for complete search history.

(56) References Cited

U.S. PATENT DOCUMENTS 9,273,580 B2    3/2016   Hüthwohl
2007/0271918 A1   11/2007  Nishiyama et al.
(Continued)

FOREIGN PATENT DOCUMENTS

CN    1938499 A    3/2007
CN    102105660 A   6/2011
(Continued)

OTHER PUBLICATIONS

Machine English translation of JP 2013-213501.*
(Continued)

*Primary Examiner* — Mark Laurenzi
*Assistant Examiner* — Jason Sheppard
(74) *Attorney, Agent, or Firm* — Sterne, Kessler, Goldstein & Fox P.L.L.C.

(57) ABSTRACT

A supercharged engine includes an emission control device configured to add a reduction agent to exhaust gas from an engine main body to reduce nitrogen oxide in the exhaust gas by a catalyst, the supercharged engine including an air release valve configured to discharge a part of supplied air to be supplied from a supercharger to the engine main body through an air feed pipe to the outside of the air feed pipe, and a control device configured to control temperature of the exhaust gas by operating the air release valve and adjusting an amount of supply of the supplied air to be supplied from the supercharger to the engine main body.

4 Claims, 10 Drawing Sheets

(51) Int. Cl.
  *F01N 3/08*   (2006.01)
  *F01N 3/20*   (2006.01)
  *F02B 37/16*  (2006.01)
  *F02D 41/00*  (2006.01)
  *F02D 41/14*  (2006.01)

(52) U.S. Cl.
  CPC ......... *F01N 3/2053* (2013.01); *F01N 3/2066* (2013.01); *F02B 37/16* (2013.01); *F02D 41/0007* (2013.01); *F02D 41/1446* (2013.01); *F01N 2430/08* (2013.01); *F01N 2560/026* (2013.01); *F01N 2590/02* (2013.01); *F02D 2200/0802* (2013.01); *Y02T 10/144* (2013.01); *Y02T 10/24* (2013.01); *Y02T 10/26* (2013.01)

(56) References Cited

U.S. PATENT DOCUMENTS

| | | | | |
|---|---|---|---|---|
| 2012/0036835 A1* | 2/2012 | Huthwohl | ............ | F01N 3/2066 60/274 |
| 2013/0000297 A1* | 1/2013 | Moravec | ............... | F02D 41/025 60/600 |
| 2013/0273256 A1 | 10/2013 | Kishita et al. | | |

FOREIGN PATENT DOCUMENTS

| | | | |
|---|---|---|---|
| JP | H02115538 A | | 4/1990 |
| JP | H07189720 A | | 7/1995 |
| JP | H1054251 A | | 2/1998 |
| JP | 2006316728 A | | 11/2006 |
| JP | 2007-154770 A | | 6/2007 |
| JP | 2008-121629 A | | 5/2008 |
| JP | 2009-299617 A | | 12/2009 |
| JP | 201048111 A | | 3/2010 |
| JP | 2010-127188 A | | 6/2010 |
| JP | 2012-523518 A | | 10/2012 |
| JP | 2013100834 A | | 5/2013 |
| JP | 2013-213501 A | | 10/2013 |
| JP | 2013213501 A | * | 10/2013 |
| KR | 20110124133 A | | 11/2011 |
| WO | WO 2008/097139 A1 | | 8/2008 |

OTHER PUBLICATIONS

PCT/JP2014/077866, International Search Report, dated Jan. 13, 2015, 4 pages.

First Office Action issued in Chinese Patent Application No. 201480058408.2 dated Sep. 21, 2017.

Decision of Refusal issued in Japanese Patent Application No. 2013-219693 dated Apr. 21, 2017.

Extended European Search Report issued in European Patent Application No. 14855387.8 dated Apr. 28, 2017.

* cited by examiner

Second map β1 (corresponding to coordinates α1)

Second map β2 (corresponding to coordinates α2)

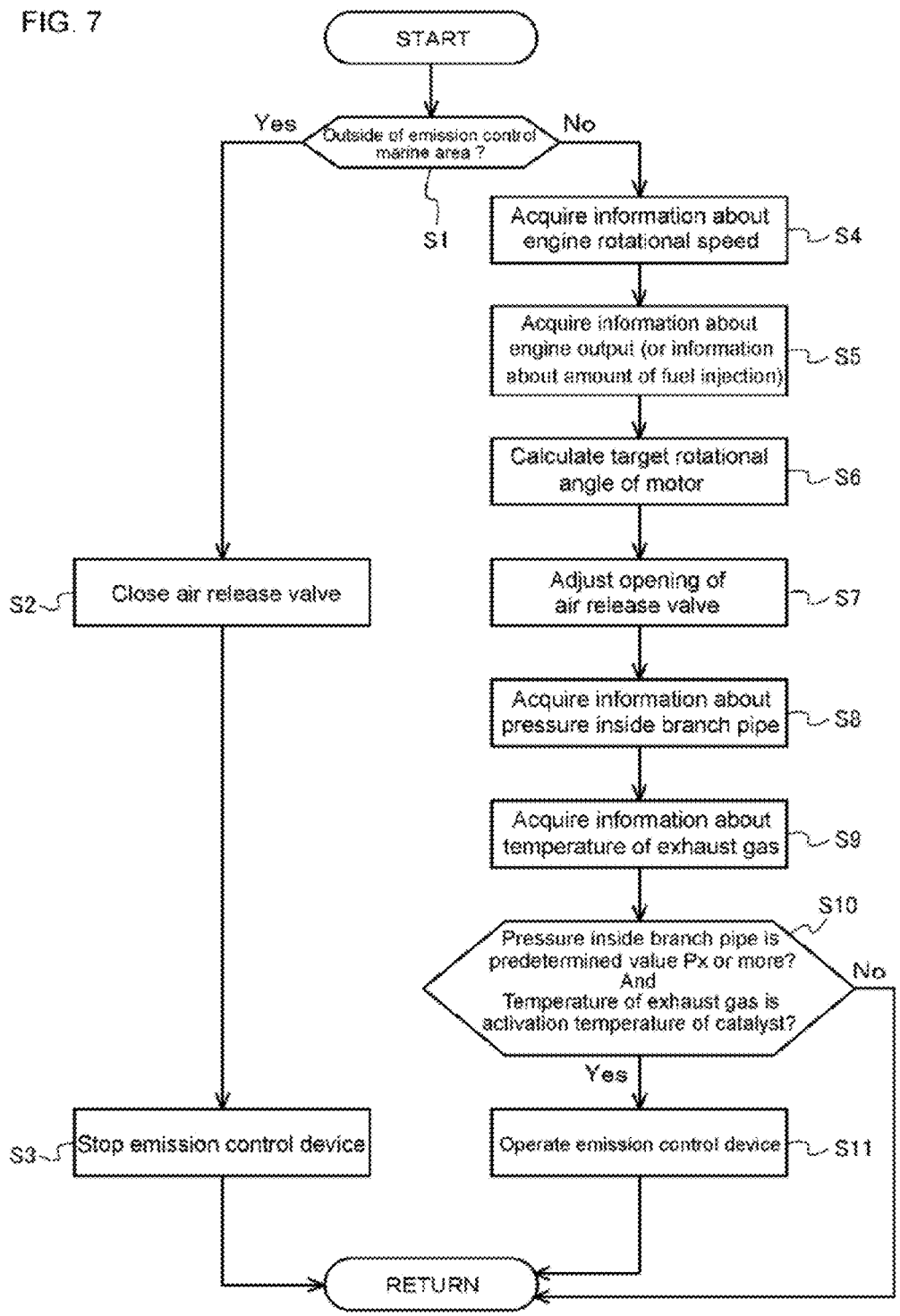

NOx conversion efficiency Q = $\dfrac{\text{Catalyst inlet NOx amount R1} - \text{Catalyst outlet NOx amount R2}}{\text{Catalyst inlet NOx amount R1}}$

ENGINE WITH SUPERCHARGER

TECHNICAL FIELD

The present invention relates to a supercharged engine.

BACKGROUND ART

Conventionally, a technology of a supercharged engine provided with an emission control device is known (for example, Patent Document 1).

With a conventional supercharged engine, a permitted temperature of exhaust gas is sometimes set low from the standpoint of reducing fuel consumption.

In the case of providing such a supercharged engine with an emission control device (SCR system) for adding a reduction agent, such as urea water, to exhaust gas and reducing nitrogen oxide in the exhaust gas by a catalyst, the temperature of the exhaust gas may not rise to the activation temperature of the catalyst, and the efficiency of the catalyst reaction of the emission control device may be reduced.

Accordingly, the specifications of the supercharged engine have to be changed to achieve a balance between the engine performance and the exhaust gas temperature.

That is, the specifications of the supercharged engine have to be changed according to the type (activation temperature) of catalyst to be used by the emission control device, and the temperature of the exhaust gas has to be adjusted such that a temperature of the exhaust gas necessary to activate the catalyst used by the emission control device may be achieved. However, there are, for example, the following demerits: (1) it is necessary to receive regulatory certification regarding exhaust gas for each change in the specification, (2) a development test has to be conducted for each change in the specification, and the number of steps of development testing is increased, and (3) changed specifications would involve different parts, and the number of parts to be managed is increased.

PRIOR ART DOCUMENT

Patent Document 1: JP-A 2010-127188

SUMMARY OF THE INVENTION

Problems to be Solved by the Invention

The present invention provides a supercharged engine that is capable of achieving a temperature of exhaust gas necessary to activate a catalyst used by an emission control device, without having the specifications of the supercharged engine changed.

Solutions to the Problems

The present invention is a supercharged engine provided with an emission control device configured to add a reduction agent to exhaust gas to reduce nitrogen oxide in the exhaust gas by a catalyst, and includes an air release valve configured to discharge a part of supplied air to be supplied from a supercharger to an engine main body through an air feed pipe to an outside of the air feed pipe, and a control device configured to control temperature of the exhaust gas by operating the air release valve and adjusting an amount of supply of the supplied air to be supplied from the supercharger to the engine main body.

According to the present invention, the control device operates the air release valve during operation of the emission control device in such a way that the temperature of the exhaust gas reaches activation temperature of the catalyst which is stored in advance.

According to the present invention, there are included a location calculation device configured to calculate a current location of the emission control device, and a temperature detection device configured to detect the temperature of the exhaust gas, where the control device acquires information about the current location of the emission control device from the location calculation device, operates the air release valve to discharge a part of the supplied air to the outside of the air feed pipe, and acquires information about the temperature of the exhaust gas from the temperature detection device. If the current location of the emission control device is within an exhaust emission control area set in advance and the temperature of the exhaust gas reaches activation temperature of the catalyst, the control device operates the emission control device.

According to the present invention, the emission control device includes a nozzle configured to inject mixed air of pressurized air and the reduction agent, and the nozzle injects mixed air of supplied air discharged from the air feed pipe by the air release valve and the reduction agent.

Effects of the Invention

According to the present invention, it is possible to achieve a temperature of exhaust gas necessary to activate a catalyst used by an emission control device without changing the specifications of a supercharged engine.

BRIEF DESCRIPTION OF THE DRAWINGS

FIG. 7 is a flow chart of sailing of a ship.

EMBODIMENTS OF THE INVENTION

A ship 1 will be described hereinafter.

Figure 1:
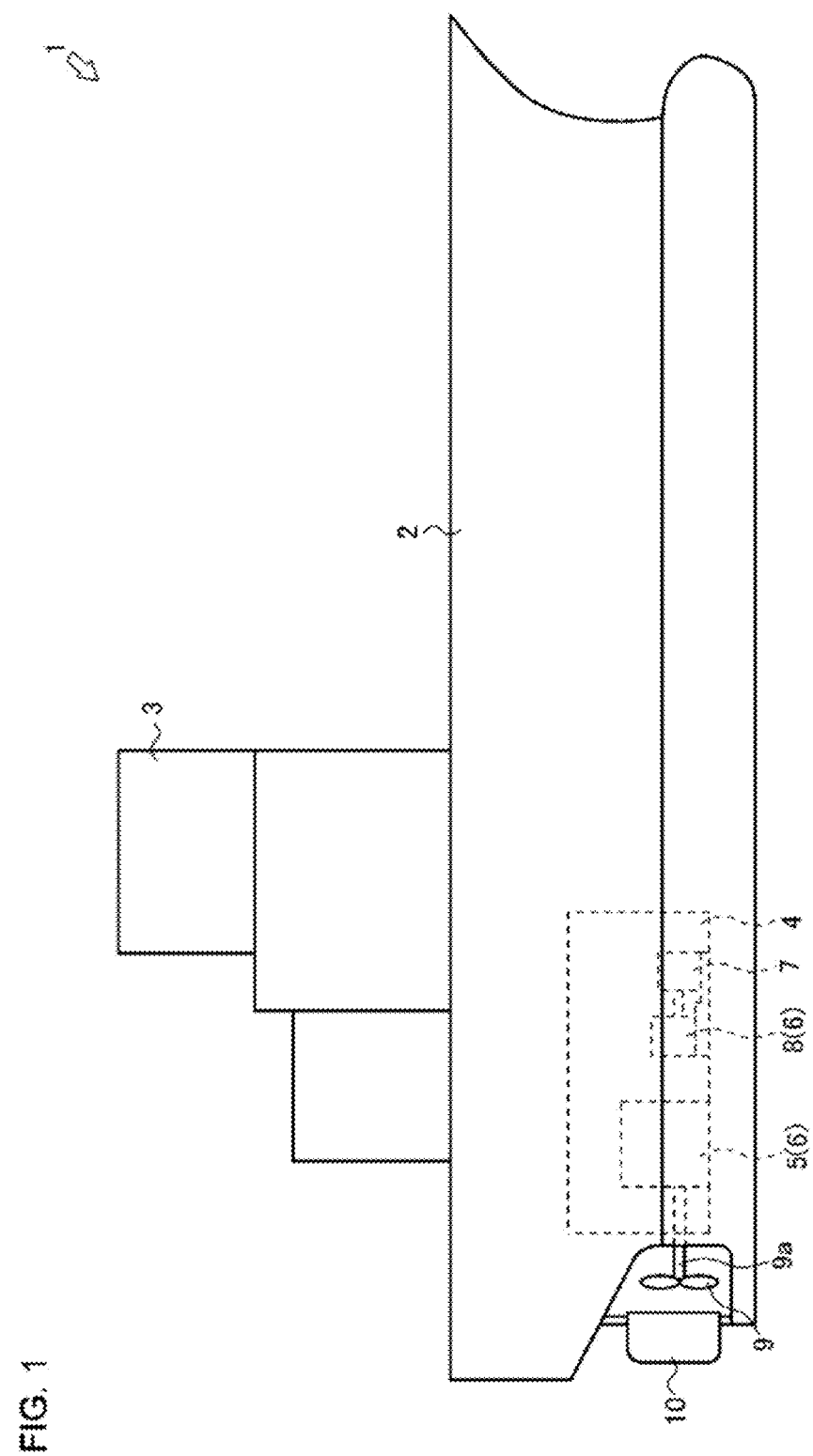
FIG. 1 is a schematic diagram showing a structure of a ship.

As shown in FIG. 1, the ship 1 includes a hull 2, a bridge 3, an engine room 4, a propeller 9, and a helm 10. The ship 1 includes, on the hull 2, the bridge 3 including a cockpit and the like. Also, the ship 1 includes the engine room 4 at the rear of the hull 2. The engine room 4 includes a main engine 5, which is an engine for moving the ship 1 and which drives the propeller 9, and an auxiliary engine 8, which is an engine for power generation and which drives a generator 7. The propeller 9 and the helm 10 are provided at the stern of the hull 2. The ship 1 is structured in such a way that the power of the main engine 5 is transmitted to the propeller 9 through a propeller shaft 9a.

Here, the main engine 5 and the auxiliary engine 8 are each a supercharged engine 6 that uses light oil or heavy oil as fuel.

The engine room 4 is one section inside the ship where the main engine 5, the auxiliary engine 8, and the generator 7 are installed. The engine room 4 is provided at the rear of the hull 2 and near the propeller 9. The engine room 4 has the main engine 5 disposed on the stern side, and three sets of supercharged engines 6 and the generator 7 on the bow side.

The supercharged engine 6 installed in the ship 1 will be described. Additionally, in the present embodiment, the supercharged engine 6 is installed in a ship, but this is not restrictive.

Figure 2:
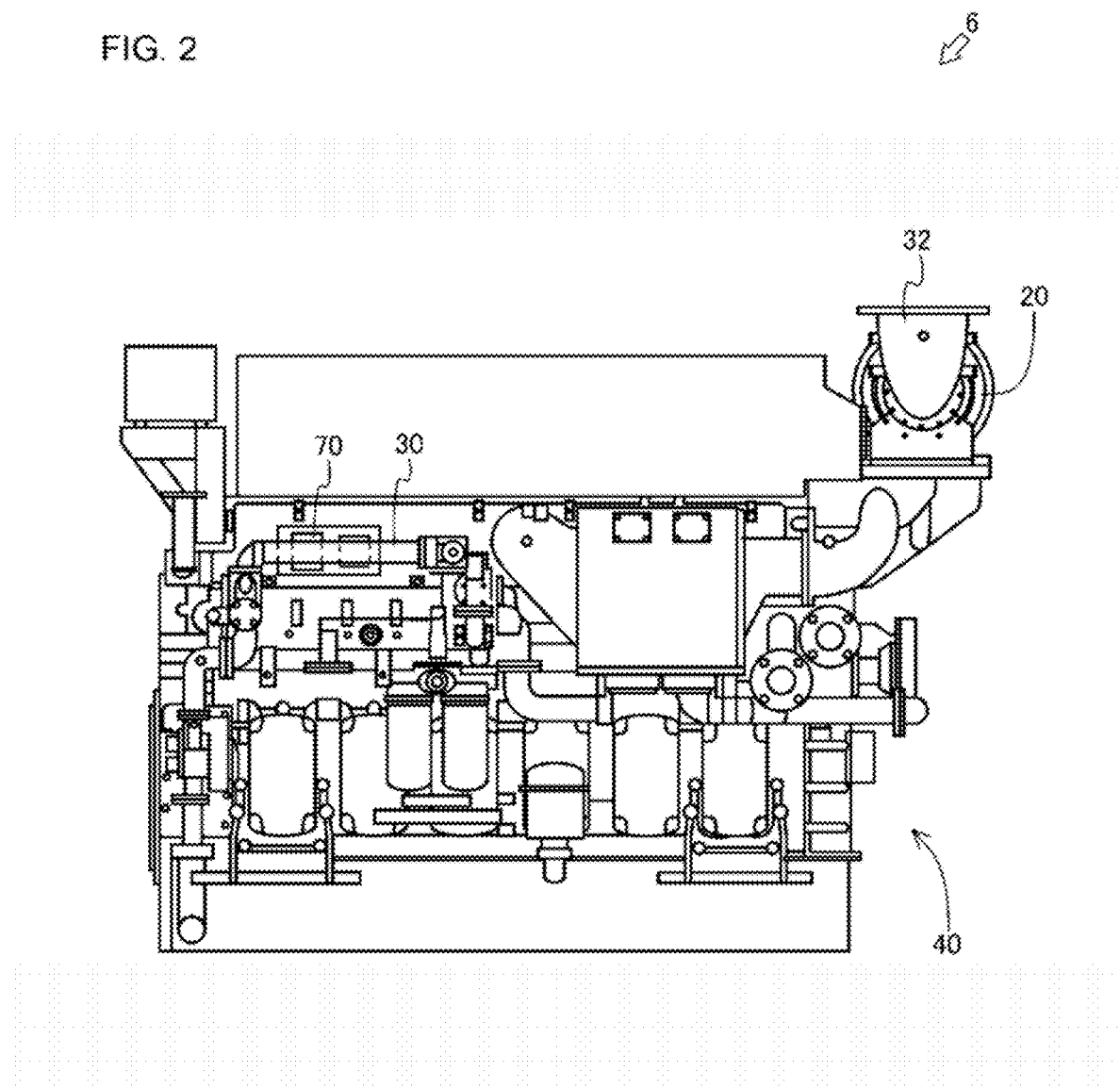
FIG. 2 is a side view of a supercharged engine.
Figure 3:
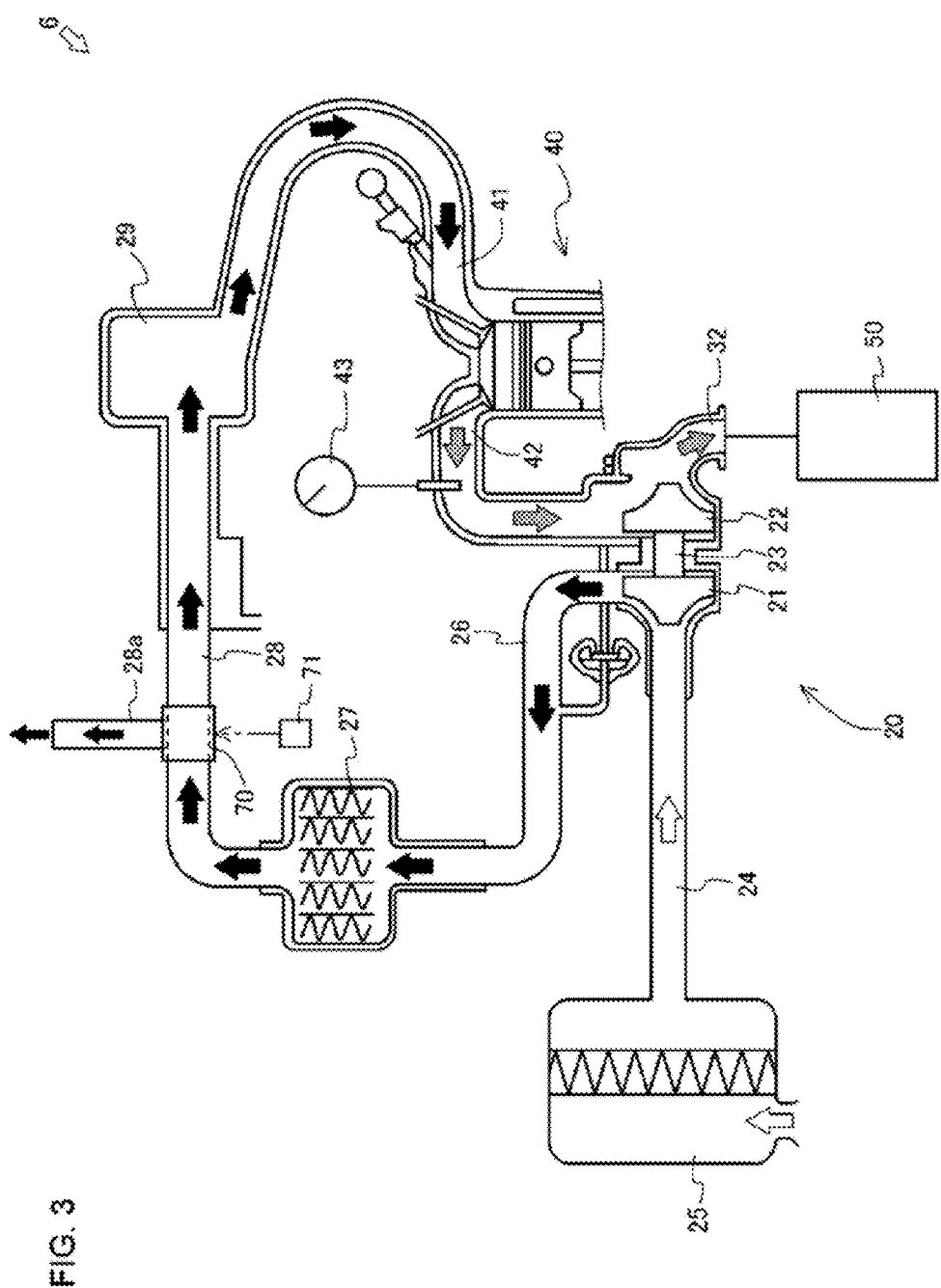
FIG. 3 is a conceptual diagram showing an intake/exhaust system of the supercharged engine.
Figure 4:
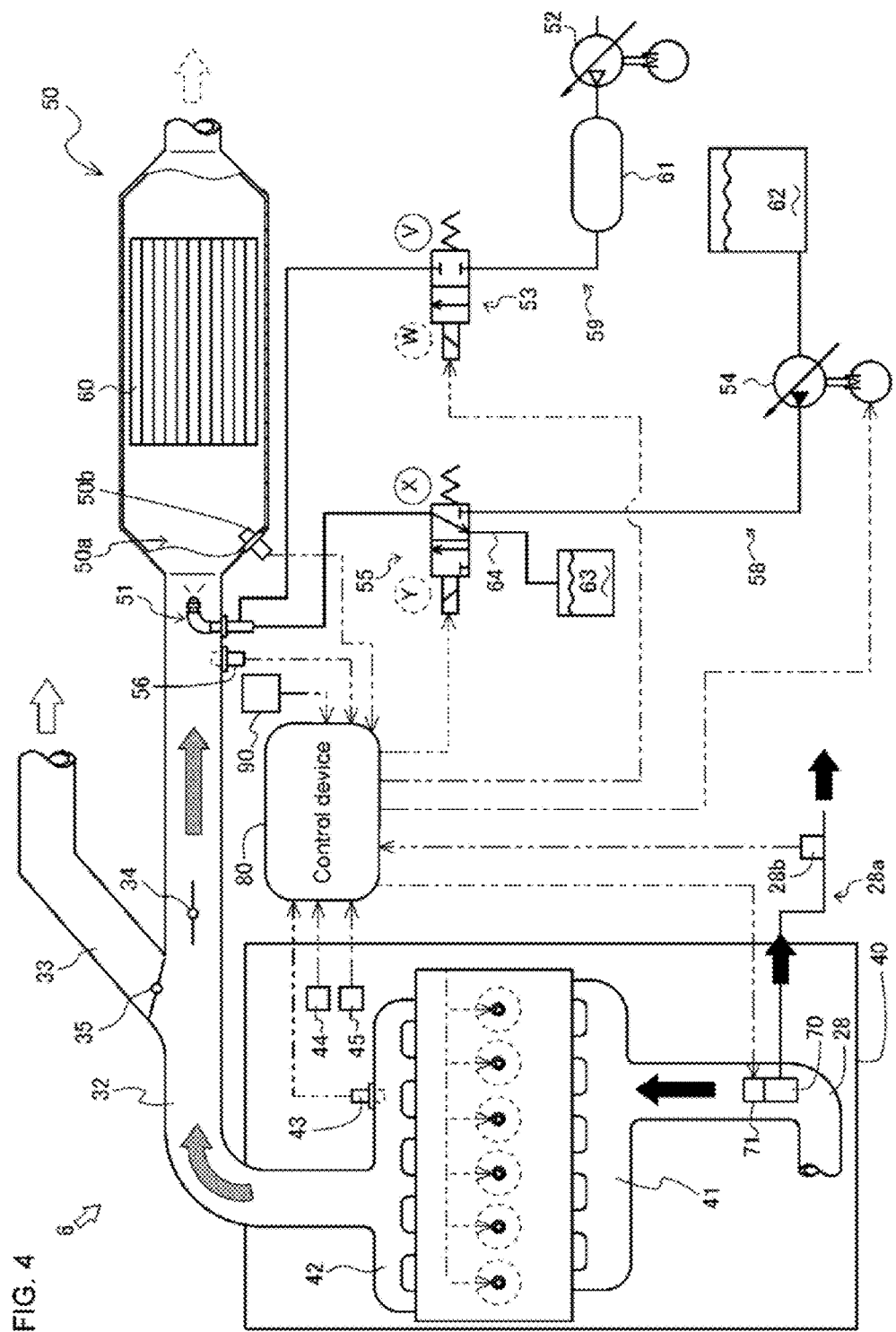
FIG. 4 is a conceptual diagram showing an emission control device of the supercharged engine.

As shown in FIGS. 2 to 4, the supercharged engine 6 includes a supercharger 20, an engine main body (diesel engine) 40, an emission control device 50, an air release valve 70, a control device 80, a location calculation device 90, and the like.

As shown in FIG. 3, the supercharger 20 includes a compressor unit 21 and a turbine unit 22. The compressor unit 21 and the turbine unit 22 are connected together by a connecting shaft 23, and are capable of rotating together.

The compressor unit 21 of the supercharger 20 communicates with outside through an air intake pipe 24 and an air cleaner 25. Also, the compressor unit 21 is coupled to an intercooler 27 through an air feed pipe 26. The intercooler 27 is coupled to a surge tank 29 through an air feed pipe 28. The surge tank 29 is coupled to an intake manifold 41 of the engine main body 40.

An exhaust manifold 42 of the engine main body 40 is coupled to the turbine unit 22 of the supercharger 20. The turbine unit 22 is coupled to the emission control device 50 through an exhaust pipe 32. Also, the exhaust manifold 42 of the engine main body 40 is provided with a temperature detection device (exhaust gas thermometer) 43 for detecting the temperature of exhaust gas from the engine main body 40.

Furthermore, the engine main body 40 is provided with an engine rotational speed detection device 44 for detecting speed of revolutions per unit time (engine rotational speed) of the engine main body 40. The engine main body 40 is also provided with an output detection device 45 for detecting an engine output. Additionally, a fuel detection device for detecting the amount of injection per unit time of fuel to be supplied to the combustion chamber may be provided instead of the output detection device 45.

During driving of the engine main body 40, the outside air is taken in by the compressor unit 21 of the supercharger 20 through the air cleaner 25, and is pressurized and compressed. Then, the air (supplied air) pressurized and compressed by the compressor unit 21 is discharged from the supercharger 20. The supplied air discharged from the supercharger 20 is supplied to the intercooler 27 and is cooled, and is then supplied to the surge tank 29. The supplied air supplied to the surge tank 29 is supplied to the engine main body 40 through the intake manifold 41. The engine main body 40 rotationally drives the output shaft by mixing and burning, inside its cylinder, the supplied air which has been supplied and fuel. Then, the engine main body 40 discharges the exhaust gas that is generated by combustion of the fuel. That exhaust gas that is discharged from the engine main body 40 is supplied to the turbine unit 22 of the supercharger 20 through the exhaust manifold 42. The turbine unit 22 is rotated by the exhaust gas flowing in. The rotating power of the turbine unit 22 is transmitted to the compressor unit 21 through the connecting shaft 23. The exhaust gas flowing into the turbine unit 22 is discharged to outside through the exhaust pipe 32 and the emission control device 50.

Additionally, the supercharged engine 6 may include a two-stage supercharger. Also, the number of cylinders of the engine main body 40 is not particularly limited.

The exhaust pipe 32 is provided with exhaust switching valves 34, 35 for switching between a branch pipe 33 and an exhaust passage, on the upstream side of an injection nozzle 51. The branch pipe 33 is coupled to the exhaust pipe 32. The exhaust switching valve 34 is disposed inside the exhaust pipe 32, on the upstream side of the injection nozzle 51 and the downstream side of the branch pipe 33. The exhaust switching valve 35 is disposed inside the branch pipe 33.

The exhaust switching valves 34, 35 are configured to be able to open and close in coordination with each other. Specifically, the exhaust switching valves 34, 35 are configured in such a way that, when the exhaust switching valve 34 is in an open state, the exhaust switching valve 35 is in a closed state, and when the exhaust switching valve 34 is in the closed state, the exhaust switching valve 35 is in the open state. Accordingly, in the case where the exhaust switching valve 34 is in the open state and the exhaust switching valve 35 is in the closed state, the exhaust pipe 32 forms a route by which exhaust gas is supplied to the emission control device 50. On the other hand, in the case where the exhaust switching valve 34 is in the closed state and the exhaust switching valve 35 is in the open state, the exhaust pipe 32 forms a route by which the exhaust gas is discharged to outside (atmosphere) through the branch pipe 33 without being purified by the emission control device 50.

As shown in FIG. 4, the emission control device (SCR system) 50 is for purifying the exhaust gas from the engine main body 40. The emission control device 50 includes the injection nozzle 51, a pressurized air supply pump (compressor) 52, a pressurized air valve 53, a reduction agent supply pump 54, a switching valve 55, a NOx detection unit 56, a first supply channel 58, a second supply channel 59, a NOx catalyst 60, and the like.

The injection nozzle 51 is for supplying a reduction agent into the exhaust pipe 32. The injection nozzle 51 is formed by a tubular member, and is provided in such a way that its one side (on the downstream side) is inserted from the outside into the inside of the exhaust pipe 32. Pressured air and the reduction agent are mixed together inside the injection nozzle 51, and mixed air of the pressurized air and the reduction agent is injected from the injection nozzle 51.

The pressurized air supply pump 52 is for supplying the pressurized air into an air tank 61. The pressurized air supply pump 52 supplies air by pressurizing (compressing) the same. When pressure inside the air tank 61 falls to or below a predetermined pressure, the pressurized air supply pump 52 supplies air into the air tank 61, and when the pressure inside the air tank 61 reaches the predetermined pressure, the pressurized air supply pump 52 stops.

The pressurized air valve 53 is for communicating or blocking the channel for pressurized air. The pressurized air valve 53 is provided to the second supply channel 59. The pressurized air valve 53 may be switched between a position V and a position W by sliding of a spool. In the case where the spool of the pressurized air valve 53 is at the position V, the second supply channel 59 is blocked. Accordingly, pressurized air is not supplied to the injection nozzle 51. In the case where the spool of the pressurized air valve 53 is at the position W, the second supply channel 59 is communicated. Accordingly, pressurized air is supplied to the injection nozzle 51.

The reduction agent supply pump 54 is for supplying a reduction agent to the injection nozzle 51. The reduction agent supply pump 54 is provided to the first supply channel 58. The reduction agent supply pump 54 supplies a reduction agent in a tank 62 to the injection nozzle 51 through the first supply channel 58 at a predetermined flow rate.

The switching valve 55 is for switching the channel of the reduction agent. The switching valve 55 is provided on the downstream side of the reduction agent supply pump 54 of the first supply channel 58. A drain pot 63 is coupled to the switching valve 55 through a channel 64. The switching valve 55 may be switched between a position X and a position Y by sliding of a spool. In the case where the spool of the switching valve 55 is at the position X, the first supply channel 58 is blocked, and the injection nozzle 51 and the drain pot 63 are communicated with each other. In the case where the spool of the switching valve 55 is at the position Y, the first supply channel 58 is communicated. Accordingly, the reduction agent is supplied to the injection nozzle 51.

The NOx detection unit 56 is for detecting the amount of discharged NOx that is contained in the exhaust gas from the engine main body 40. The NOx detection unit 56 is configured from a NOx sensor or the like, and is disposed at a mid-portion of the exhaust pipe 32 and on the upstream side of the NOx catalyst 60.

The NOx catalyst 60 is for promoting reduction reaction of NOx. The NOx catalyst 60 is disposed inside the exhaust pipe 32, on the downstream side of the injection nozzle 51. The NOx catalyst 60 promotes reaction of reduction of NOx contained in exhaust gas to nitrogen and water by ammonia that is generated by thermal hydrolysis of the reduction agent.

At an inlet section 50a of the emission control device 50, there is provided a temperature sensor 50b for detecting the temperature of exhaust gas at the inlet section 50a. The temperature sensor 50b is provided on the downstream side of the injection nozzle 51, and detects the temperature of exhaust gas after injection of a reduction agent by the injection nozzle 51.

As shown in FIGS. 2 to 4, the air release valve 70 is for adjusting the amount of supply of supplied air from the supercharger 20 to the engine main body 40.

The air release valve 70 is provided at a mid-portion of the air feed pipe 28 connecting the intercooler 27 and the surge tank 29, and is fixed to a cylinder block of the engine main body 40. The air feed pipe 28 is integrally formed inside the block of the engine main body 40. The air release valve 70 is provided to the block of the engine main body 40, and is provided on the back side of a lubricating oil pipe 30. Furthermore, the air release valve 70 is provided on the side where many of members which have to be maintained, such as a lubricating oil filter, are present. Accordingly, in the case of using air that is released from the air release valve 70, a pipe or the like for guiding the released air may be easily installed. Also, maintenance of an actuator for operating the air release valve 70 is facilitated. Furthermore, a branch pipe 28a for discharging supplied air to outside (atmosphere) from the air feed pipe 28 is coupled to a mid-portion of the air feed pipe 28. The branch pipe 28a is provided with a pressure detection device 28b for detecting the pressure inside the branch pipe 28a. The air release valve 70 is configured to discharge supplied air cooled by the intercooler 27 to outside through the branch pipe 28a.

The air release valve 70 may increase or reduce the channel area of a communicating portion of the air feed pipe 28 and the branch pipe 28a by adjusting the opening.

The air release valve 70 increases the amount of supplied air to be discharged outside through the branch pipe 28a, by increasing the channel area of the communicating portion of the air feed pipe 28 and the branch pipe 28a. The amount of supply of the supplied air to the engine main body 40 is thus reduced, and the temperature of the exhaust gas from the engine main body 40 is increased.

Also, the air release valve 70 reduces the amount of supplied air to be discharged outside through the branch pipe 28a, by reducing the channel area of the communicating portion of the air feed pipe 28 and the branch pipe 28a. The amount of supply of the supplied air to the engine main body 40 is thus increased, and the temperature of the exhaust gas from the engine main body 40 is reduced.

Furthermore, the air release valve 70 may block the communicating portion of the air feed pipe 28 and the branch pipe 28a by being closed. The supplied air inside the air feed pipe 28 is thus supplied to the engine main body 40 without being discharged outside through the branch pipe 28a.

Figure 6A:
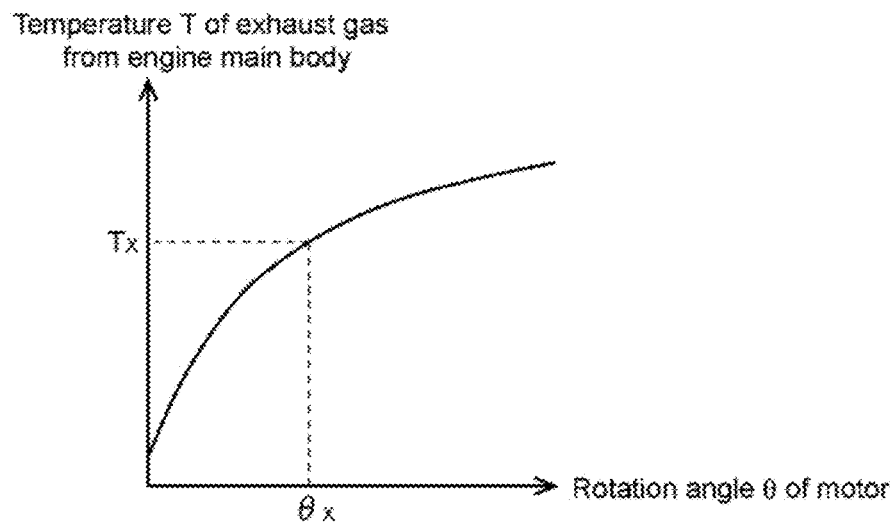
FIG. 6A is a diagram showing a second map $\beta 1$ corresponding to coordinates $\alpha 1$ in the first map $\alpha$.
Figure 6B:
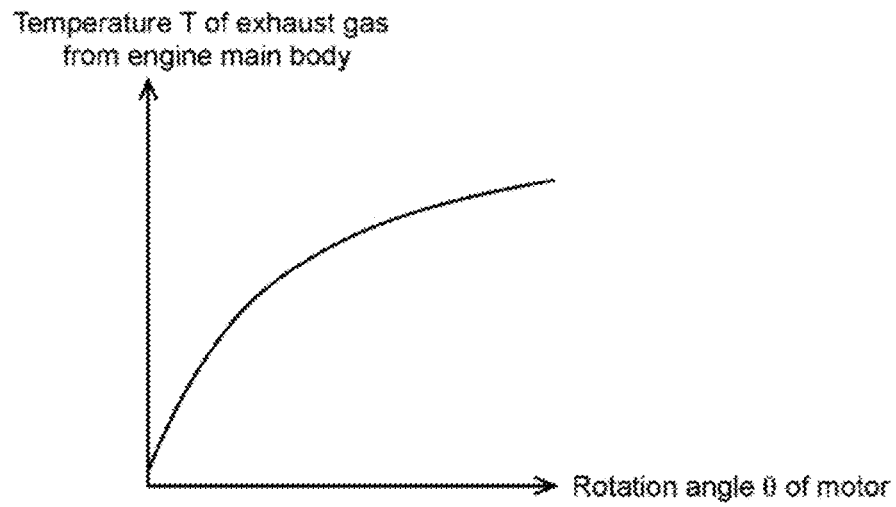
FIG. 6B is a diagram showing a second map $\beta 2$ corresponding to coordinates $\alpha 2$ in the first map $\alpha$.

A motor 71, which is an actuator for generating power for opening/closing the air release valve 70, is coupled to the air release valve 70. The opening of the air release valve 70 (the amount of discharge of supplied air) may be changed by changing a rotational angle $\theta$ of the motor 71. The corresponding opening of the air release valve 70 with respect to the rotational angle $\theta$ of the motor 71 is determined in advance. In the present embodiment, the air release valve 70 increases the amount of supplied air to be discharged through the branch pipe 28a as the rotational angle $\theta$ of the motor 71 is increased. That is, the air release valve 70 is configured to reduce the amount of supply of the supplied air to the engine main body 40 as the rotational angle $\theta$ of the motor 71 is increased. As a result, the temperature of the exhaust gas from the engine main body 40 is increased as the rotational angle $\theta$ of the motor 71 is increased (see FIGS. 6(a) and 6(b)).

As shown in FIG. 4, the control device 80 is for controlling the operation of each unit of the supercharged engine 6 and each unit of the emission control device 50.

The control device 80 is coupled to the engine rotational speed detection device 44, and is capable of acquiring information about the engine rotational speed by receiving a signal from the engine rotational speed detection device 44.

The control device 80 is coupled to the output detection device 45 (or the fuel detection device), and is capable of acquiring information about engine output by receiving a signal from the output detection device 45.

The control device 80 is coupled to the pressure detection device 28b, and is capable of receiving information about the pressure inside the branch pipe 28a by receiving a signal from the pressure detection device 28b.

The control device 80 is coupled to each of the reduction agent supply pump 54, the switching valve 55, and the pressurized air valve 53, and is capable of controlling the operation of the reduction agent supply pump 54, the switching valve 55, and the pressurized air valve 53.

The control device 80 is coupled to the motor 71, and is capable of controlling the operation of the air release valve 70 by operating the motor 71.

The control device 80 is coupled to the location calculation device 90 which is capable of calculating the current location of the emission control device 50. The location calculation device (GPS receiver) 90 receives a signal from a GPS satellite, and calculates the current location of the emission control device 50 based on the received signal.

Furthermore, the control device 80 stores an exhaust emission control area map M1.

Figure 5:
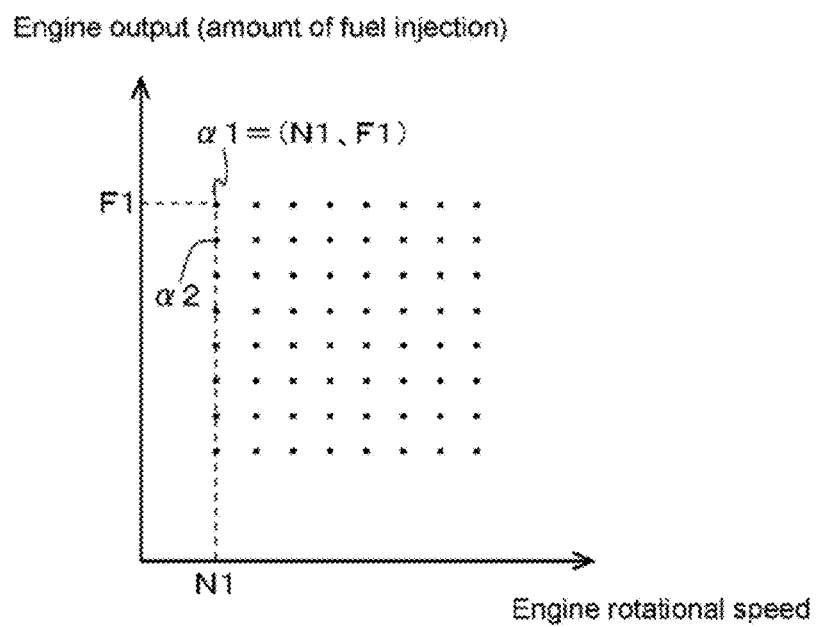
FIG. 5 is a diagram showing a first map $\alpha$.

The control device 80 stores a first map α. As shown in FIG. 5, in the first map α, the vertical axis indicates the engine output (or the amount of fuel injection), and the horizontal axis indicates the engine rotational speed. Accordingly, coordinates α1, α2 and so forth on the first map α include the engine output (or the amount of fuel injection) and the engine rotational speed. Additionally, the engine rotational speed and the engine output of the coordinates α1 are given as N1 and F1, respectively (coordinates α1=(N1, F1)).

The control device 80 stores second maps β1, β2 and so forth. As shown in FIGS. 6(*a*) and 6(*b*), the second maps β1, β2 and so forth each shows a correlation between the rotational angle θ of the motor 71 and temperature T of exhaust gas from the engine main body 40.

The coordinates α1, α2 and so forth in the first map α correspond to the second maps β1, β2 and so forth, respectively. The coordinates α1 corresponds to the second map β1, and the coordinates α2 corresponds to the second map β2.

The control device 80 stores information about activation temperature TX of a catalyst (NOx catalyst 60) used by the emission control device 50. The activation temperature TX is the temperature that is necessary to activate the NOx catalyst 60. The activation temperature TX may take values having a range such as equal to or higher than T1° C., or equal to or higher than T1° C. and equal to or less than T2° C., or may take a value having no range, such as T1° C.

The control device 80 is coupled to the temperature detection device 43, and is capable of receiving, from the temperature detection device 43, information about the temperature T of exhaust gas from the engine main body 40.

The control device 80 is coupled to the temperature sensor 50*b*, and is capable of acquiring, from the temperature sensor 50*b*, information about temperature of exhaust gas at the inlet section 50*a* of the emission control device 50.

In the following, a mode of control of each unit of the supercharged engine 6 by the control device 80, where the supercharged engine 6 is installed in the ship 1, will be described with reference to FIG. 7.

In step S1, during sailing of the ship 1, the control device 80 acquires information about the current location of the emission control device 50 from the location calculation device 90, and determines whether the emission control device 50 is outside an exhaust emission control area or not, based on the acquired information about the current location of the emission control device 50 and the control area map M1.

In the case where it is determined by the control device 80 that the emission control device 50 is outside the exhaust emission control area (step S1: Yes), the process proceeds to step S2.

In the case where it is determined by the control device 80 that the emission control device 50 is within the exhaust emission control area (step S1: No), the process proceeds to step S4.

In step S2, after determining that the emission control device 50 is outside the exhaust emission control area, the control device 80 closes the air release valve 70 by the motor 71, and blocks the channel of the communicating portion of the air feed pipe 28 and the branch pipe 28*a* by the air release valve 70. A state is thereby achieved in which the supplied air inside the air feed pipe 28 is supplied to the engine main body 40 without being discharged outside through the branch pipe 28*a*.

In step S3, the control device 80 stops the emission control device 50. To stop the emission control device 50 is to stop injection of a reduction agent from the injection nozzle 51. In the present embodiment, the control device 80 stops the emission control device 50 by stopping the pressurized air supply pump 52 and the reduction agent supply pump 54 and by switching the spool of the pressurized air valve 53 to the position V and the spool of the switching valve 55 to the position X (see FIG. 4).

Then, the process proceeds to step S1.

A state, as indicated by steps 2 and 3, in which the supplied air is prevented by the air release valve 70 from being discharged outside is referred to as a low fuel consumption mode.

As described above, outside the exhaust emission control area, by switching to the low fuel consumption mode, the supplied air from the supercharger 20 may be supplied to the engine main body 40 without being discharged outside from the air release valve 70, and thus the engine main body 40 may be efficiently driven.

In step S4, after determining that the emission control device 50 is within the exhaust emission control area, the control device 80 acquires information about the engine rotational speed by receiving a signal from the engine rotational speed detection device 44. In the present embodiment, the acquired engine rotational speed is assumed to be N1.

In step S5, the control device 80 acquires information about the engine output (information about the amount of fuel injection) by receiving a signal from the output detection device 45 (the fuel detection device). In the present embodiment, the acquired engine output is assumed to be F1.

In step S6, the control device 80 calculates, by using the first map α, the coordinates α1 including the engine rotational speed N1 acquired in step S4 and the engine output (amount of fuel injection) F1 acquired in step S5 (see FIG. 5). Then, the control device 80 calculates, by using the second map β1 corresponding to the coordinates α1, a rotational angle θX (target rotational angle θX) corresponding to the activation temperature TX of the NOx catalyst 60 (see FIG. 6A).

In step S7, the control device 80 drives the motor 71 to the target rotational angle θX. The opening of the air release valve 70 is thereby adjusted such that the temperature T of the exhausts gas from the engine main body 40 reaches the activation temperature TX.

In step S8, the control device 80 acquires information about the pressure inside the branch pipe 28*a* by receiving a signal from the pressure detection device 28*b*. In the present embodiment, the pressure inside the branch pipe 28*a* is assumed to be P1.

In step S9, the control device 80 acquires information about the temperature of the exhaust gas from the engine main body 40 by receiving a signal from the temperature detection device 43. In the present embodiment, the temperature of the exhaust gas from the engine main body 40 is assumed to be T1.

In step S10, the control device 80 checks whether the pressure P1 inside the branch pipe 28*a* acquired in step S8 is at or above a predetermined value PX. The predetermined value PX is the pressure inside the branch pipe 28*a* when the air release valve 70 is open and a part of supplied air is flowing through the branch pipe 28*a*, and the value is determined in advance by an experiment or the like. When the pressure inside the branch pipe 28a is at or above the predetermined value PX, the control device 80 determines that a part of supplied air is being discharged outside the air feed pipe 28 through the branch pipe 28a, and when the pressure is below the predetermined value PX, the control device 80 determines that the air release valve 70 is closed and that supplied air is not discharged outside through the branch pipe 28a.

Furthermore, the control device 80 checks whether the temperature T1 of the exhaust gas from the engine main body 40 acquired in step S9 is at the activation temperature TX of the NOx catalyst 60 or not.

In the case where it is confirmed that the pressure P1 inside the branch pipe 28a is at or above the predetermined value PX (that a part of supplied air is discharged outside the air feed pipe 28), and that the temperature T1 of the exhaust gas from the engine main body 40 is at the activation temperature TX of the NOx catalyst 60 (step S10: Yes), the control device 80 proceeds to step S11.

In the case where it is confirmed that the pressure P1 inside the branch pipe 28a is below the predetermined value PX (that the air release valve 70 is closed), and that the temperature T1 of the exhaust gas from the engine main body 40 has not reached the activation temperature TX of the NOx catalyst 60 (step S10: No), the control device 80 proceeds to step S1.

In step S11, the control device 80 causes the emission control device 50 to operate. To cause the emission control device 50 to operate is to cause the injection nozzle 51 to inject a reduction agent. In the present embodiment, the control device 80 causes the emission control device 50 to operate by driving the pressurized air supply pump 52 and the reduction agent supply pump 54 and by switching the spool of the pressurized air valve 53 to the position W and the spool of the switching valve 55 to the position Y (see FIG. 4).

Then, the process proceeds to step S1.

A state, as indicated by step S11, in which the temperature of the exhaust gas from the engine main body 40 is at the activation temperature TX of the NOx catalyst 60 and the emission control device 50 is caused to operate is referred to as an exhaust purification mode.

As described above, in the exhaust emission control area, by switching to the exhaust purification mode, the emission control device 50 may be caused to operate in a state in which the temperature of the exhaust gas is at the activation temperature TX of the NOx catalyst 60 and a reduction agent may be injected from the injection nozzle 51, and exhaust purification performance may be improved.

Furthermore, by adjusting the amount of supply of supplied air to the engine main body 40 by operating the air release valve 70, the temperature of exhaust gas from the engine main body 40 may be controlled, and thus the temperature of exhaust gas necessary to activate the catalyst used by the emission control device 50 may be achieved simply by adjusting the opening of the air release valve 70, without changing the specifications of the engine main body 40.

Moreover, since the temperature of exhaust gas from the engine main body 40 can be controlled, the selectivity in the catalyst used by the emission control device 50 may be increased.

Moreover, the temperature of exhaust gas from the engine main body 40 may be controlled and desirable temperature of exhaust gas may be maintained during operation of the emission control device 50, and thus the life of the catalyst used by the emission control device 50 may be increased.

Furthermore, as indicated by steps 1 and 10, by setting conditions for causing the emission control device 50 to operate, erroneous operation of the emission control device 50 may be suppressed.

Furthermore, the temperature of exhaust gas may be prevented from being reduced, simply by operating the pressurized air release valve 70 and adjusting the amount of supply of supplied air to the engine main body 40, and thus the cost for introducing a device for achieving the necessary exhaust temperature TX may be suppressed.

Figure 8:
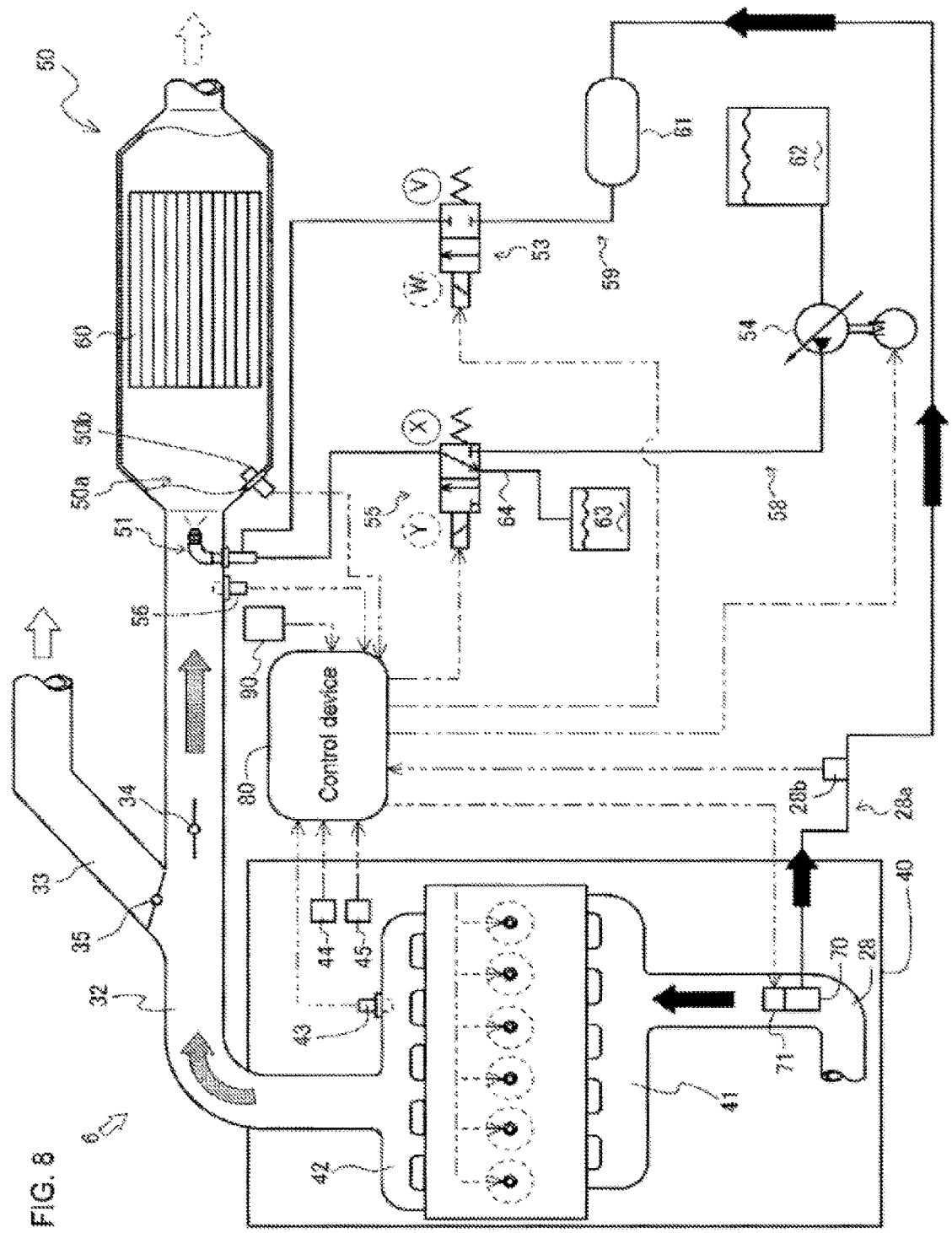
FIG. 8 is a conceptual diagram of an example modification of the supercharged engine.

Additionally, as shown in FIG. 8, the branch pipe 28a may be coupled to the second supply channel 59, and supplied air discharged from the air feed pipe 28 through the air release valve 70 may be supplied to the injection nozzle 51 through the branch pipe 28a and the second supply channel 59.

The injection nozzle 51 thereby injects a reduction agent in the exhaust purification mode by using the supplied air discharged from the air release valve 70.

Accordingly, a reduction agent may be injected without using pressurized air from the pressurized air supply pump 52, and since there would be no need to provide the pressurized air supply pump 52, a logical device configuration may be realized.

Furthermore, the emission control device 50 may be caused to operate even if there is no device to supply air into the ship.

Moreover, as shown in FIG. 8 and indicated by steps S10 and S11, when the pressure inside the branch pipe 28a reaches or exceeds the predetermined value PX and the temperature T1 of exhaust gas reaches the target value TX in a state where supplied air inside the air feed pipe 28 is being supplied to the air tank 61 through the branch pipe 28a, the injection nozzle 51 injects a reduction agent by using the supplied air inside the air tank 61. Pressure necessary for injection of a reduction agent may thus be secured.

Additionally, at the time of discharging supplied air from the air feed pipe 28 by the air release valve 70 with the branch pipe 28a being disposed with its discharge port facing the emission control device 50, the supplied air that is discharged may be blown toward a sensor or the like of the emission control device 50 to cool the sensor or the like of the emission control device 50.

This eliminates the need to separately provide a device for cooling the sensor or the like of the emission control device 50, and a logical device configuration may be realized.

Figure 9:
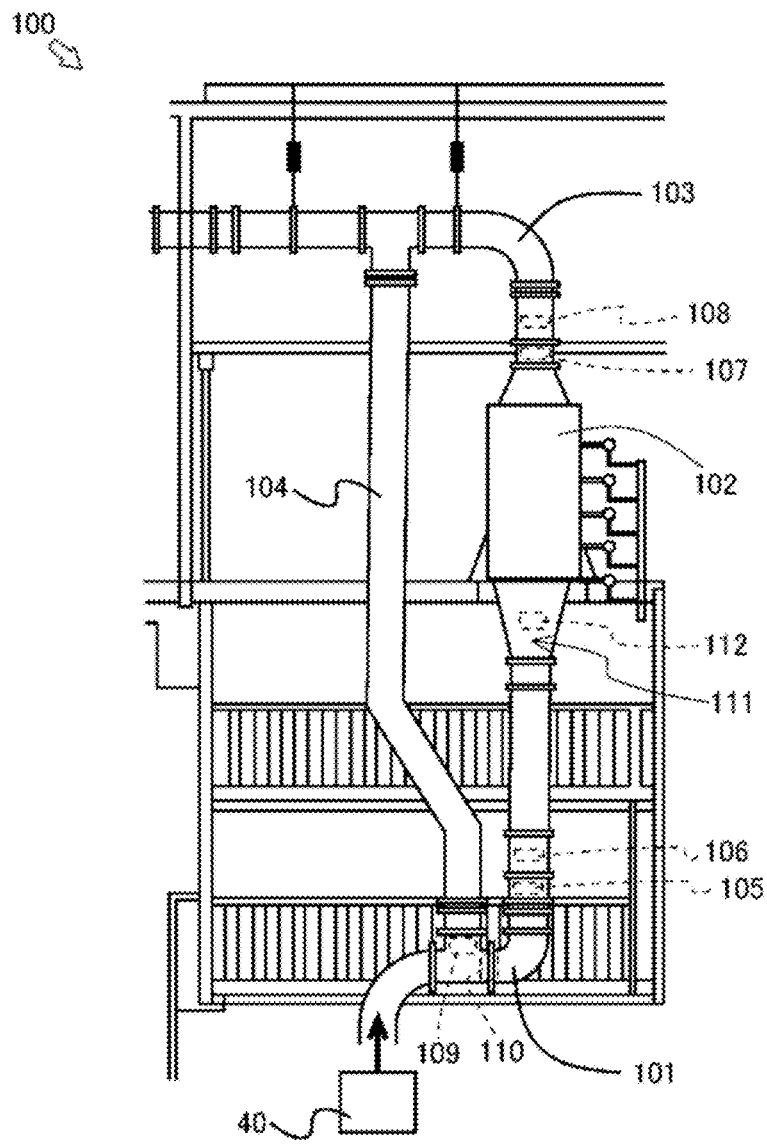
FIG. 9 is a diagram showing a testing device.

FIG. 9 shows a testing device 100.

The testing device 100 includes a first exhaust pipe 101, an emission control device (catalyst tank) 102, a second exhaust pipe 103, a branch pipe (bypass line) 104, an inlet-side NOx detection unit 105, an injection nozzle 106, an outlet-side NOx detection unit 107, and an NH3 slip amount detection device 108.

The first exhaust pipe 101 has one end coupled to the engine main body 40 and the other end coupled to the emission control device 102. The second exhaust pipe 103 is coupled to the exhaust side of the emission control device 102. The emission control device 102 corresponds to the emission control device 50, and purifies exhaust gas by using a catalyst (denitration catalyst). Exhaust gas discharged from the engine main body 40 is discharged to the atmosphere through the first exhaust pipe 101, the emission control device 102, and the second exhaust pipe 103 in this order.

The branch pipe 104 has one end coupled to a mid-portion of the first exhaust pipe 101 and the other end coupled to a mid-portion of the second exhaust pipe 103. The branch pipe 104 corresponds to the branch pipe 33. Exhaust switching valves 109, 110 are provided at a connecting portion of the branch pipe 33 and the first exhaust pipe 101. The exhaust switching valve 109 corresponds to the exhaust switching valve 35, and the exhaust switching valve 110 corresponds to the exhaust switching valve 34.

Since the branch pipe 104 and the exhaust switching valves 109, 110 are provided, the exhaust passage may be switched to one of the branch pipe 104 and the first exhaust pipe 101.

The inlet-side NOx detection unit 105 is provided to the first exhaust pipe 101, on the downstream side of the connecting portion of the branch pipe 33 and the first exhaust pipe 101. The inlet-side NOx detection unit 105 detects the amount of catalyst inlet NOx that is contained in the exhaust gas before the exhaust gas flows into the emission control device 102. The injection nozzle 106 is provided to the first exhaust pipe 101, on the downstream side of the inlet-side NOx detection unit 105, that is, between the inlet-side NOx detection unit 105 and the emission control device 102. The injection nozzle 106 corresponds to the injection nozzle 51, and supplies a reduction agent (urea water) into the first exhaust pipe 101.

The outlet-side NOx detection unit 107 is provided to the second exhaust pipe 103. The outlet-side NOx detection unit 107 detects the amount of catalyst outlet NOx that is contained in the exhaust gas flowing out of the emission control device 102, that is, the exhaust gas which has been purified. The NH3 slip amount detection device 108 is provided to the second exhaust pipe 103, on the downstream side of the outlet-side NOx detection unit 107. The NH3 slip amount detection device 108 detects the amount of NH3 slip, that is, the amount of ammonia that is contained in the exhaust gas that is discharged to the atmosphere through the second exhaust pipe 103. The branch pipe 104 is coupled to the second exhaust pipe 103, on the downstream side of the NH3 slip amount detection device 108.

An inlet section 111 of the emission control device (catalyst tank) 102 is provided with a temperature sensor 112 for detecting the temperature of exhaust gas at the inlet section 111.

The testing device 100 is capable of calculating a NOx conversion efficiency Q (=(R1−R2)/R1) based on a detected value R1 of the amount of catalyst inlet NOx according to the inlet-side NOx detection unit 105 and a detected value R2 of the amount of catalyst outlet NOx according to the outlet-side NOx detection unit 107. Also, the testing device 100 is capable of detecting the amount of NH3 slip by the NH3 slip amount detection device 108.

Figure 10:
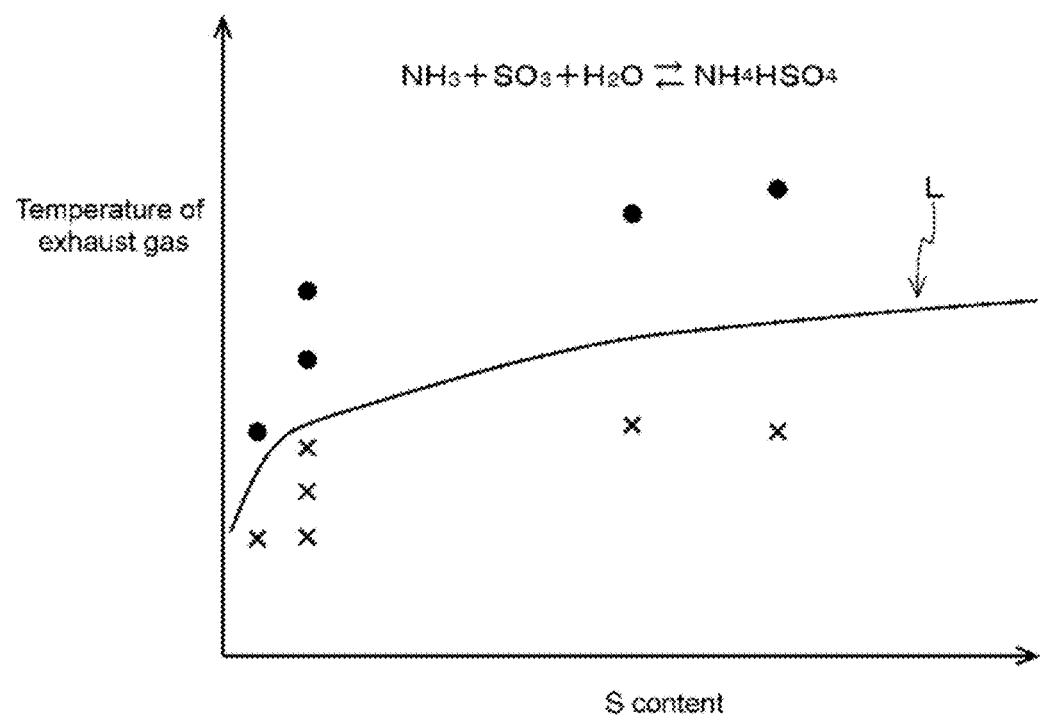
FIG. 10 is a graph showing a relationship between a temperature of exhaust gas at an inlet section of the emission control device and an S content of fuel.

FIG. 10 shows a graph showing a relationship between the temperature of exhaust gas at the inlet section 111 of the emission control device (catalyst tank) 102, the S (sulfur) content (%) of fuel, the reduction rate of the NOx conversion efficiency Q, and presence/absence of acidic ammonium sulfate (NH4HSO3). The graph in FIG. 10 is obtained by acquiring and analyzing various pieces of data such as the NOx conversion efficiency Q by using the testing device 100 and the like.

In the graph in FIG. 10, the vertical axis indicates the temperature of exhaust gas at the inlet section 111 of the emission control device (catalyst tank) 102, and the horizontal axis indicates the S (sulfur) content of the fuel used by the engine main body 40.

It can be seen from FIG. 10 that, in a region below a line L, acidic ammonium sulfate (NH4HSO3) is generated and the reduction rate of the NOx conversion efficiency Q is high (see the crosses in FIG. 10). That is, when the temperature of exhaust gas at the inlet section 111 of the emission control device (catalyst tank) 102 is reduced, acidic ammonium sulfate (NH4HSO3) is generated, and the reduction rate of the NOx conversion efficiency Q becomes high. When acidic ammonium sulfate is generated, the catalyst of the emission control device 102 is degraded by the acidic ammonium sulfate, and the exhaust purification function (NOx conversion efficiency Q) is thereby reduced, and thus generation of the acidic ammonium sulfate is desirably suppressed.

On the other hand, as shown in FIG. 10, it can be seen that, in a region above the line L, acidic ammonium sulfate (NH4HSO3) is not generated and the reduction rate of the NOx conversion efficiency Q is low (see the black-painted circles in FIG. 10). That is, when the temperature of exhaust gas at the inlet section 111 of the emission control device (catalyst tank) 102 is increased, acidic ammonium sulfate (NH4HSO3) is not generated, and the reduction rate of the NOx conversion efficiency Q becomes low. Accordingly, to maintain a desirably exhaust purification function (NOx conversion efficiency Q) of the emission control device 102, it is desirable to control the temperature of exhaust gas from the engine main body 40 in such a way that the temperature of the exhaust gas at the inlet section 111 of the emission control device (catalyst tank) 102 is in the region above the line L.

The supercharged engine 6 described above is capable of controlling the temperature of exhaust gas from the engine main body 40 by using the air release valve 70. Accordingly, the supercharged engine 6 is capable of controlling the temperature of exhaust gas from the engine main body 40 in such a way that the temperature of the exhaust gas at the inlet section 111 of the emission control device (catalyst tank) 102 is in the region above the line L. Therefore, generation of acidic ammonium sulfate may be suppressed, and degradation of the NOx catalyst 60 may be slowed.

INDUSTRIAL APPLICABILITY

The present invention is applicable to a supercharged engine.

DESCRIPTION OF REFERENCE SIGNS

6: Supercharged engine
20: Supercharger
40: Engine main body
50: Emission control device
60: NOx catalyst
70: Air release valve
80: Control device

The invention claimed is:

1. A supercharged engine, comprising:
a selective catalytic reduction system configured to add a reduction agent to exhaust gas to reduce nitrogen oxide in the exhaust gas by a catalyst;
an air release valve disposed in an air feed pipe configured to discharge a part of supplied air supplied from a supercharger to an engine main body through a branch pipe connected with a mid-position of the air feed pipe; and
a control device configured to control temperature of the exhaust gas by operating the air release valve and adjusting an amount of the supplied air supplied from the supercharger to the engine main body through the air feed pipe, wherein the control device is configured to operate the air release valve during operation of the selective catalytic reduction system in such a way that the temperature of the exhaust gas reaches activation temperature of the catalyst which is stored in advance, wherein in the case where it is confirmed that the pressure inside the branch pipe is at or above a predetermined value, and that the temperature of the exhaust gas is at or above the activation temperature of the catalyst, the control device causes the selective catalytic reduction system to operate, and wherein in the case where it is confirmed that the pressure inside the branch pipe is below the predetermined value, and that the temperature of the exhaust gas is below the activation temperature of the catalyst, the control device does not cause the selective catalytic reduction system to operate.

2. The supercharged engine according to claim 1, comprising:

a location calculation device configured to calculate a current location of the selective catalytic reduction system; and a temperature detection device configured to detect the temperature of the exhaust gas, wherein the control device is configured to acquire information about the current location of the selective catalytic reduction system from the location calculation device, operate the air release valve to discharge a part of the supplied air to the outside of the air feed pipe, and acquire information about the temperature of the exhaust gas from the temperature detection device, and if the current location of the selective catalytic reduction system is within an exhaust emission control area set in advance and the temperature of the exhaust gas reaches activation temperature of the catalyst, the control device operates the selective catalytic reduction system.

3. The supercharged engine according to claim 1, wherein a nozzle is configured to inject a mixture of the supplied air discharged from the air feed pipe by the air release valve and the reduction agent into the exhaust gas.

4. The supercharged engine according to claim 2, wherein a nozzle is configured to inject a mixture of the supplied air discharged from the air feed pipe by the air release valve and the reduction agent into the exhaust gas.

* * * * *